March 12, 1935. P. A. RAICHE 1,994,178
METHOD AND APPARATUS FOR TRIMMING MOLDED ARTICLES
Filed Sept. 7, 1932 2 Sheets-Sheet 1
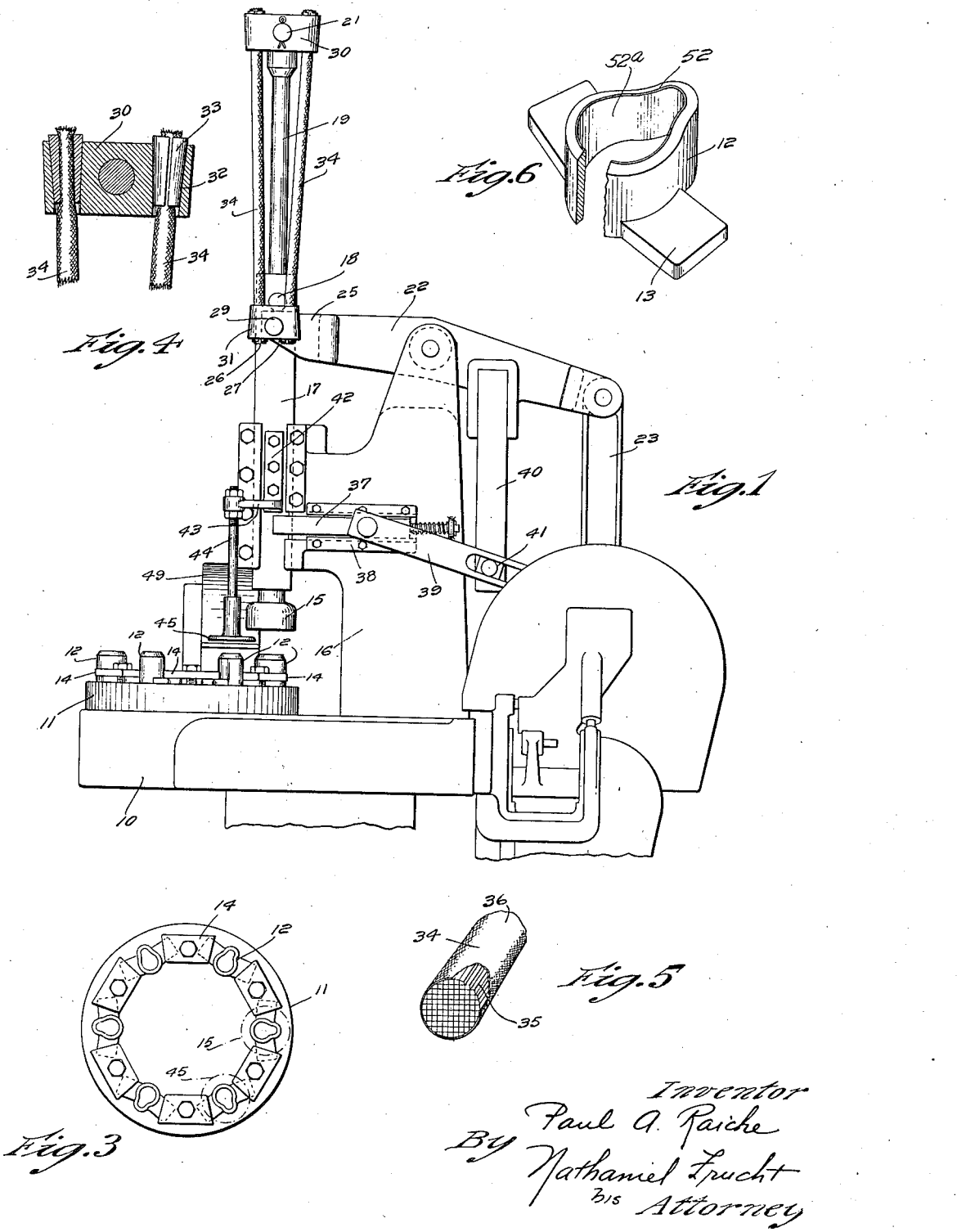
Inventor
Paul A. Raiche
By Nathaniel Frucht
his Attorney March 12, 1935. P. A. RAICHE 1,994,178
METHOD AND APPARATUS FOR TRIMMING MOLDED ARTICLES
Filed Sept. 7, 1932 2 Sheets-Sheet 2
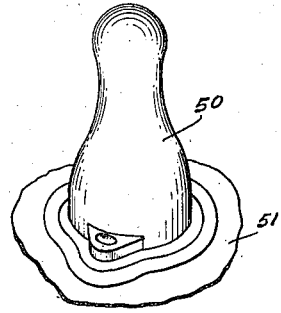
Fig. 7
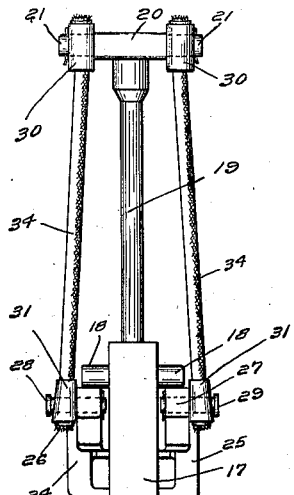
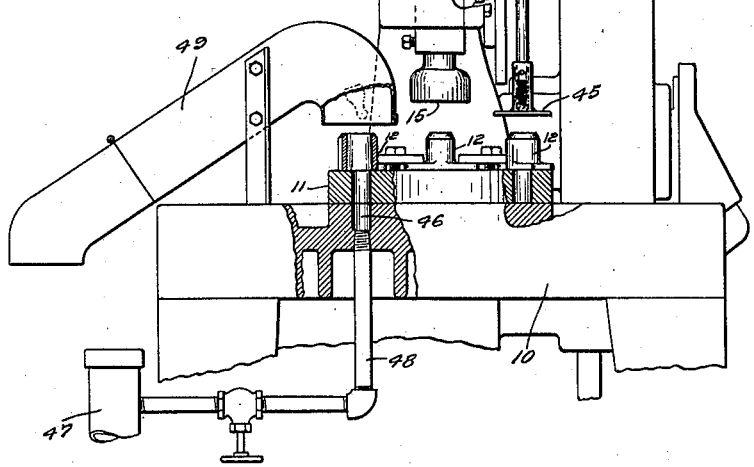
Fig. 2
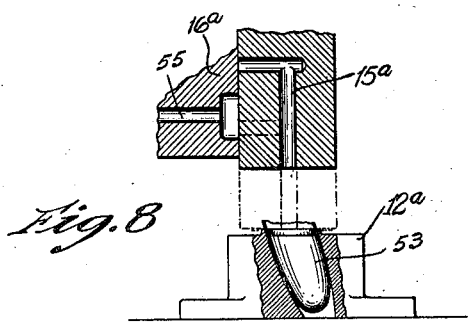
Fig. 8
Inventor
Paul A. Raiche
By Nathaniel Frucht
his Attorney Patented Mar. 12, 1935

1,994,178

UNITED STATES PATENT OFFICE 1,994,178

METHOD AND APPARATUS FOR TRIMMING MOLDED ARTICLES

Paul A. Raiche, Providence, R. I., assignor to Davol Rubber Co., a corporation of Rhode Island Application September 7, 1932, Serial No. 631,970

19 Claims. (Cl. 164—25)

My present invention relates to the molding of rubber articles, and has particular reference to the finishing of the molded articles.

The articles which are removed from the molds have an overflow, and this overflow must be trimmed before the articles are packed for shipment. When the molded articles have circular bases, this trimming is readily accomplished with a circular knife trimming machine of standard type; but such machines cannot be commercially utilized for trimming molded articles which have non-circular bases. It is the principal object of my invention to devise a manufacturing procedure suitable for the commercial trimming of molded articles having non-circular bases.

It has been found necessary to use impact trimming machines which utilize dies for shearing or fracturing the overflow, but the impact trimming machines of standard type have been found impractical, on account of the short life of the spring actuating mechanism and the short life of the trimmer dies. It is a further object of my invention to improve the operation of an impact trimming machine so as to increase its effective life and to increase its trimming efficiency.

To this end, I have improved the operating mechanism by so mounting the spring actuating members that the pull is always in alignment with the spring axes, thus preventing spring breakage due to lateral pressures or forces; and I have improved the construction of the trimmer dies so as to increase their effective life, while at the same time ensuring a sufficient fracture or shear of the overflow.

In order to lower the operating cost and speed up the trimming operation, I have positioned a setting device for automatically setting the molded article in proper position in the trimmer die, and I have utilized a periodic air blast to eject the trimmed article. Since certain types of articles have overflows which must be forced away from the trimmer dies during the trimming operation, I have further provided an auxiliary air blast for spreading the overflow prior to and during the trimming.

With the above and other objects and advantageous features in view, the invention consists of a novel procedure and a novel arrangement of parts more fully disclosed in the detailed description following, in conjunction with the accompanying drawings, and more specifically defined in the claims appended thereto.

In the drawings,

Fig. 1 is a side view of the improved trimming machine;

Fig. 2 is a front view thereof, parts being broken away;

Fig. 3 is a plan view of the trimmer die indexing plate;

Fig. 4 is an enlarged sectional detail of the novel spring mounting;

Fig. 5 is a sectional perspective of the spring, the cover being broken away;

Fig. 6 is a perspective view of a trimmer die, partly broken away;

Fig. 7 is a perspective view of a molded nipple, showing the overflow; and

Fig. 8 is a sectional detail of the overflow spreading arrangement.

Referring to the drawings, the trimming machine comprises a base 10, on which the die plate 11 is mounted for indexing movement, the die plate having a plurality of hollow trimmer dies 12 releasably secured thereon; a preferred construction includes side wings 13 which are locked downwardly by lock plates 14 bolted or otherwise attached to the indexing die plate.

Cooperating with the trimmer dies is a hammer 15 mounted for vertical movement in a support standard 16, the hammer comprising a flat base which impacts on the trimmer dies and a vertical shank 17 which is suitably guided in the support standard. The upper end of the shank has a pin 18 extending therethrough, and has a spring support rod 19 extending vertically and terminating in a horizontal spring support pin 20 which has cylindrical pivot ends 21.

The hammer operating mechanism includes a lever 22 pivotally mounted on the support standard 16, and actuated by an oscillating crank arm 23 having its lower end secured to a rotating crank pin of standard type. The hammer end of the lever 22 is bifurcated, see Fig. 2, the two ends 24, 25 extending about the hammer shank and having support bosses 26, 27 through which pivot pins 28, 29 are respectively mounted. Spring holders 30 are mounted on the pivot ends 21, and similar spring holders 31 are mounted on the pivot pins 28, 29, these holders being shown in section in Fig. 4, and having tapered openings 32 in which split tapered bushings 33 seat to firmly grip the ends of the springs 34. The springs are preferably, see Fig. 5, formed of longitudinal rubber strands 35, with a textile cover 36 of braided or similar threads.

A plunger 37, see Fig. 1, is reciprocatingly mounted in guides 38 formed in or secured to the support standard, and is actuated by a lever 39 which in turn is operated in timed relation to the movement of the lever 22 by means of an arm 40 and a pin and slot mechanism 41. The end of the plunger 37 is adapted to engage with the lower end of a plate 42 secured to the hammer shank, this plate having an arm 43 extending therefrom to form a bearing for the upper end 44 of a rod which has a seating plate 45 reciprocatingly mounted thereon, see Fig. 2, the plate 45 being spring pressed downwardly as shown.

Referring now to Fig. 2, it will be noted that the base 10 has an opening 46 therethrough with which the trimmer dies become aligned after the shearing action as the die plate indexes, this opening being supplied with compressed air from a reservoir 47 through a valve controlled conduit 48; the base of the die plate acts as an intermittently rotating valve to control flow of the compressed air through the trimmer dies for ejecting the trimmed articles upwardly into an outlet trough 49 which leads to a receptacle or basket.

The operation of the novel trimming apparatus may now be explained: The operator sits in front of the machine, and inserts the molded articles which in the described instance are nipples 50 having irregular bases and overflows 51, downwardly into the trimmer dies as the die plate indexes. As the nipples are carried around by the die plate, the lever 22 is moved to tension the springs, and the plunger 37 is pulled back by the lever 39 to release the plate 42, whereupon the springs pull the hammer down to impact the head on the overflow and thus shear it from the nipple body; the down stroke of the hammer also forces the setting rod and plate down to resiliently impact the next nipple and thus set it in the proper position for trimming. The indexed die plate then carries the trimmed nipple over the opening 46, and the compressed air blast ejects the nipple into the receiving trough 49.

Referring now to Fig. 6, it has been found that the trimmer die 12 will not stand up under continuous operation unless the impact area or land 52 is from ten to twenty thousandths of an inch in width, and that the inner surface 52a should be vertical; a slight undercutting or recessing of the inner surface may be desirable to provide clearance, in trimming molded articles having a slight bulge. After the molded articles have been trimmed, they are tumbled in a standard tumbling mill to ensure complete removal of the overflow.

If the article is not generally perpendicular to the overflow, as in the case of finger cots 53 such as indicated in Fig. 8, the overflow may fold or turn in the modified die 12a so as to prevent proper shearing, and it is preferred to position an air flow passageway 15a in the hammer, so as to communicate with a compressed air supply conduit 55 in the modified support standard 16a when moving down to shearing position, whereby an air blast is directed downwardly to spread the overflow just prior to the shearing action. This air blast is not of sufficient force to drive the finger cot down into the die, but is ample to press the overflow outwardly during descent of the hammer.

It will be noted that the swivel connections for the tension springs prevent lateral tensions and strains, the connections turning so as to always maintain an axial direction for the tensile force. The rubber cords or lengths are thus stretched only in the direction of their length, and the life of the springs is greatly increased.

The use of compressed air as the work ejecting medium and as the overflow spreading medium has been found very economical, as there is no wear, and the operator's attention is not required. The utilization of the moving parts of the machine for the valve control has further eliminated upkeep and repair, as the wear is negligible.

It is therefore evident that the invention provides an efficient apparatus which has long operative life and a minimum of repairs and replacements, and which speeds up production while eliminating need for skilled operators. The cost per finished article is thus greatly reduced.

While I have described specific constructional details which embody the inventive features, it is evident that such changes in the relative arrangement of parts, in their size, and in their functions, may be made as are deemed necessary for trimming a particular molded article, within the spirit and the scope of the invention as defined in the appended claims.

I claim:

1. The method of trimming a molded article having a non-circular base and an overflow, comprising the steps of manually positioning the article in a trimmer die, mechanically setting the article in trimming position, shearing the overflow, and ejecting the sheared article from the die by compressed air.

2. The method of trimming a molded article of hollow formation and having a non-circular base and an overflow, comprising the steps of spreading the overflow, and shearing the spread overflow.

3. The method of trimming a molded article having a non-circular base and an overflow, comprising the steps of manually positioning the article in a trimmer die, mechanically setting the article in trimming postion, spreading the overflow by compressed air, shearing the overflow, and ejecting the sheared article from the die by compressed air.

4. In a trimming machine, a hammer, a trimmer die, means for periodically actuating said hammer to contact said trimmer die, and means for ejecting articles upwardly from said trimmer die by compressed air after contact by said hammer.

5. In a trimming machine, a hammer, a trimmer die plate, trimmer dies positioned on said die plate, means for reciprocating said hammer, means for indexing said die plate in timed relation to the hammer reciprocations, and means for automatically setting articles in the dies prior to engagement with the hammer.

6. In a trimming machine, a hammer, a trimmer die plate, trimmer dies positioned on said die plate, means for reciprocating said hammer, means for indexing said die plate in timed relation to the hammer reciprocations, means for automatically setting articles in the dies prior to engagement with the hammer, and means for ejecting said articles from the dies after contact by said hammer.

7. In a trimming machine, a reciprocatable hammer, spring means for actuating said hammer, a spring tensioning member, and swivel connections connecting said spring means to said hammer and said tensioning member.

8. In combination, a trimming machine spring, a swivel connection therefor having a tapered opening, and a tapered bushing engaging the end of said spring and seated in said opening.

9. In combination, a trimming machine spring, a swivel connection therefor having spaced tapered openings, and tapered bushings engaging the ends of said spring and seated in said openings.

10. In a trimming machine, a base, a die plate mounted for rotation thereon, a die positioned on said die plate, and an opening in said base communicating with a compressed air supply, said die plate and die having openings periodically communicating with the opening in said base.

11. In a trimming machine for trimming articles of hollow formation, a reciprocating hammer, a trimmer die, an air flow passage extending through the hammer and directed towards the trimmer die, and means for periodically communicating said passage with a supply of air under pressure.

12. In a trimming machine for molded articles having overflows, a trimmer die, a reciprocating hammer, and means for spreading the overflow just prior to contact of said hammer with said die.

13. In a trimming machine for molded articles having overflows, a trimmer die, a reciprocating hammer, and means comprising a device to produce a jet of compressed air for spreading the overflow just prior to contact of said hammer with said die.

14. The method of trimming a molded article having an overflow, comprising the steps of setting the article in trimming position in a trimmer die, shearing the overflow, and ejecting the sheared article from the trimmer die by compressed air.

15. The method of trimming a molded article having an overflow, comprising the steps of setting the article in trimming position in a trimmer die, spreading the overflow, shearing the overflow, and ejecting the sheared article from the trimmer die by compressed air.

16. The method of trimming a molded article having an overflow, comprising the steps of setting the article in trimming position in a trimmer die, spreading the overflow by compressed air, shearing the overflow, and ejecting the sheared article from the trimmer die by compressed air.

17. The method of trimming a molded article of hollow formation and having an overflow, comprising the steps of spreading the overflow, and shearing the spread overflow.

18. The method of trimming a molded article of hollow formation and having an overflow, comprising the steps of spreading the overflow by compressed air, and shearing the spread overflow.

19. In a trimming machine, a hammer, a trimmer die plate, trimmer dies positioned on said die plate, means for reciprocating said hammer, means for indexing said die plate in timed relation to the hammer reciprocations, means for automatically setting articles in the dies prior to engagement with the hammer, and means for ejecting said articles from the dies after contact by said hammer by compressed air.

PAUL A. RAICHE.